(12) United States Patent
Park et al.

(10) Patent No.: US 10,937,420 B2
(45) Date of Patent: Mar. 2, 2021

(54) DIALOGUE SYSTEM AND METHOD TO IDENTIFY SERVICE FROM STATE AND INPUT INFORMATION

(71) Applicants: HYUNDAI MOTOR COMPANY, Seoul (KR); KIA MOTORS CORPORATION, Seoul (KR)

(72) Inventors: Jung Mi Park, Anyang-si (KR); Jimin Han, Anyang-si (KR); Jia Lee, Uiwang-si (KR); Kye Yoon Kim, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 98 days.

(21) Appl. No.: 16/005,097

(22) Filed: Jun. 11, 2018

(65) Prior Publication Data

US 2019/0147867 A1 May 16, 2019

(30) Foreign Application Priority Data

Nov. 10, 2017 (KR) .................. 10-2017-0149205

(51) Int. Cl.
*G10L 15/22* (2006.01)
*G10L 15/30* (2013.01)
(Continued)

(52) U.S. Cl.
CPC ........ *G10L 15/22* (2013.01); *G06F 16/90332* (2019.01); *G06F 21/31* (2013.01);
(Continued)

(58) Field of Classification Search
CPC . G10L 15/22; G10L 15/1815; G10L 15/1822; G10L 2015/223; G10L 2015/225; G10L 2015/228; H04L 67/22
(Continued)

(56) References Cited

U.S. PATENT DOCUMENTS 5,577,165 A * 11/1996 Takebayashi ........... G10L 15/26
704/251
6,505,162 B1 * 1/2003 Wang ...................... G10L 15/22
704/270
(Continued)

FOREIGN PATENT DOCUMENTS

EP 3096226 A1 11/2016
JP 2016076117 A 6/2011
(Continued)

*Primary Examiner* — Martin Lerner
(74) *Attorney, Agent, or Firm* — Brinks Gilson & Lione

(57) ABSTRACT

The present disclosure provides a dialogue system and a method for controlling thereof. The dialogue system may include: an input processor configured to authenticate a user and receive new input information and new state information of the user; a storage configured to store existing state information of the user, existing input information, and available services; a controller configured to identify a service based on the new input information and the existing input information, and to identify the service based on the new state information of the user and the existing state information of the user, wherein the service is configured to fit needs of the user; and an output processor configured to determine a service format based on the new input information and the new state information of the user, wherein the service format is regarding ways to provide the service to the user.

16 Claims, 11 Drawing Sheets

(51) Int. Cl.
    *G06F 21/32*     (2013.01)
    *H04L 29/08*     (2006.01)
    *G06F 21/31*     (2013.01)
    *G06F 16/9032*     (2019.01)
    *G06N 5/00*     (2006.01)

(52) U.S. Cl.
    CPC ............ *G06F 21/32* (2013.01); *G06N 5/00* (2013.01); *G10L 15/30* (2013.01); *H04L 67/22* (2013.01); *H04L 67/306* (2013.01); *G10L 2015/223* (2013.01); *G10L 2015/228* (2013.01); *H04L 67/10* (2013.01)

(58) Field of Classification Search
    USPC ................. 704/270, 270.1, 275; 707/768
    See application file for complete search history.

(56) References Cited

U.S. PATENT DOCUMENTS

| | | | | |
|---|---|---|---|---|
| 7,603,427 | B1 * | 10/2009 | Horvitz | H04L 67/18 |
| | | | | 709/207 |
| 7,606,700 | B2 * | 10/2009 | Ramsey | G06F 17/278 |
| | | | | 704/251 |
| 8,145,494 | B2 * | 3/2012 | Horioka | G10L 15/22 |
| | | | | 704/270 |
| 9,117,447 | B2 | 8/2015 | Gruber et al. | |
| 9,318,109 | B2 * | 4/2016 | Boies | G10L 15/1815 |
| 2007/0115920 | A1 * | 5/2007 | Ramakrishna | G06Q 10/107 |
| | | | | 370/352 |
| 2008/0201135 | A1 * | 8/2008 | Yano | G10L 15/1822 |
| | | | | 704/231 |
| 2009/0119158 | A1 * | 5/2009 | Chen | H04L 41/507 |
| | | | | 705/7.11 |
| 2010/0017348 | A1 * | 1/2010 | Pinckney | G06N 20/00 |
| | | | | 706/11 |
| 2013/0339022 | A1 | 12/2013 | Baldwin et al. | |
| 2014/0136212 | A1 * | 5/2014 | Kwon | G10L 15/22 |
| | | | | 704/275 |
| 2014/0310001 | A1 * | 10/2014 | Kalns | G10L 15/22 |
| | | | | 704/270.1 |
| 2014/0316880 | A1 * | 10/2014 | Williams | G06F 16/9566 |
| | | | | 705/14.41 |
| 2015/0278210 | A1 | 10/2015 | Novotny et al. | |
| 2016/0313868 | A1 * | 10/2016 | Weng | G10L 15/22 |
| 2017/0083506 | A1 * | 3/2017 | Liu | G10L 15/18 |
| 2018/0052664 | A1 * | 2/2018 | Zhang | G06F 16/3329 |
| 2018/0061400 | A1 * | 3/2018 | Carbune | G10L 15/1815 |
| 2018/0144743 | A1 * | 5/2018 | Aggarwal | G10L 15/30 |
| 2018/0189398 | A1 * | 7/2018 | Sternberg | G06F 16/9535 |
| 2018/0226066 | A1 * | 8/2018 | Harris | G10L 15/02 |
| 2018/0232435 | A1 * | 8/2018 | Papangelis | G10L 15/063 |
| 2018/0254041 | A1 * | 9/2018 | Harper | G10L 15/1815 |
| 2019/0115016 | A1 * | 4/2019 | Seok | G10L 15/22 |
| 2019/0378515 | A1 * | 12/2019 | Kim | G10L 17/22 |
| 2019/0383827 | A1 * | 12/2019 | Steyaert | G01N 33/566 |
| 2020/0005778 | A1 * | 1/2020 | Kim | G10L 15/30 |
| 2020/0020331 | A1 * | 1/2020 | Kim | G10L 15/30 |
| 2020/0060597 | A1 * | 2/2020 | Ogawa | G10L 25/63 |

FOREIGN PATENT DOCUMENTS

| | | |
|---|---|---|
| JP | 2015219582 A | 12/2015 |
| JP | 2016218566 A | 12/2016 |
| KR | 10-1072176 B1 | 12/2010 |

\* cited by examiner

DIALOGUE SYSTEM AND METHOD TO IDENTIFY SERVICE FROM STATE AND INPUT INFORMATION

CROSS-REFERENCE TO RELATED APPLICATION

The present application claims priority to and the benefit of Korean Patent Application No. 10-2017-0149205, filed on Nov. 10, 2017, which is incorporated herein by reference in its entirety.

FIELD

The present disclosure relates to a dialogue system providing a service in consideration of a user state, and a method for controlling thereof.

BACKGROUND

The statements in this section merely provide background information related to the present disclosure and may not constitute prior art.

Many mobile devices have small screens and buttons which may cause some inconvenience to a user when visual information is provided to the user or an user input is received.

In addition, in a conventional manner, when the user inputs new information, the user had to determine a response to a notification after checking each notification. That is, the user response was an essential prerequisite to provide optimized information.

Particularly, when new information is input, the user may receive a lot of unwanted alarm.

Therefore, a dialogue system in a vehicle capable of recognizing a user's intention by interaction with the user and providing the necessary information or service may be desired.

SUMMARY

One aspect of the present disclosure provides a dialogue system capable of providing an optimized service by recognizing a service needed for a user, based on new information and user state, and a method for controlling thereof.

In one aspect of the present disclosure, a dialogue system may include: an input processor configured to authenticate a user and to receive new input information and new state information of the user; a storage configured to store existing state information of the user, existing input information, and available services; a controller configured to identify a service based on the new input information and the existing input information, and to identify the service based on the new state information of the user and the existing state information of the user, wherein the service is configured to fit needs of the user; and an output processor configured to determine a service format based on the new input information and the new state information of the user, wherein the service format relates to ways to provide the service to the user.

The new state information may include an utterance of the user and a non-verbal response of the user.

The storage may be configured to store a service history corresponding to the existing state information of the user and the existing input information.

The controller may be configured to determine the service based on the service history.

The output processor may be configured to determine the service format based on the service history.

The input processor may be configured to receive a feedback response of the user corresponding to the service provided to the user.

The controller may be configured to extract the service history based on the new input information, the new state information of the user, and the feedback response of the user.

The controller may be configured to enable the user to select at least one of the services based on the new input information and the new state information of the user.

The controller may be configured to induce the user to perform an additional utterance when additional state information of the user is needed.

The output processor may be configured to determine whether to output a follow-up service based on the new state information of the user.

A communicator may be configured to receive data from an external source, wherein the data is utilized to form a basis of the service.

In one aspect of the present disclosure, a method for controlling of a dialogue system may include: authenticating, with an input processor, a user; receiving, with the input processor, new input information and new state information of the user; storing, with a storage, existing state information of the user, existing input information, and available services; identifying, with a controller, a service based on the new input information and the existing input information; identifying, with the controller, the service based on the new state information of the user and the existing state information of the user; and determining, with an output processor, a service format based on the new input information and the new state information of the user, wherein the service is configured to fit needs of the user and the service format relates to ways to provide the service to the user.

The new state information may include an utterance of the user and a non-verbal response of the user.

In some implementations, a method for controlling of a dialogue system may further include: storing, with the storage, a service history corresponding to the existing state information of the user and the existing input information; and identifying, with the controller, the service based on the service history.

The determination of the service format may include determining, with the output processor, the service format based on the service history.

In some implementations, a method for controlling of a dialogue system may further include: receiving, with the input processor, a feedback response of the user corresponding to the service provided to the user, and extracting, with the controller, the service history based on the new input information, the new state information of the user, and the feedback response of the user.

In some implementations, a method for controlling of a dialogue system may further include: enabling, with the controller, the user to select at least one of the services based on the new input information and the new state information of the user.

The method may include inducing, with the controller, the user to perform an additional utterance when additional state information of the user is needed.

In some implementations, a method for controlling of a dialogue system may further include: determining, with the output processor, whether to output a follow-up service based on the new state information of the user.

In some implementations, a method for controlling of a dialogue system may further include: receiving, with a communicator, data from an external source, wherein the data is utilized to form a basis of the service.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
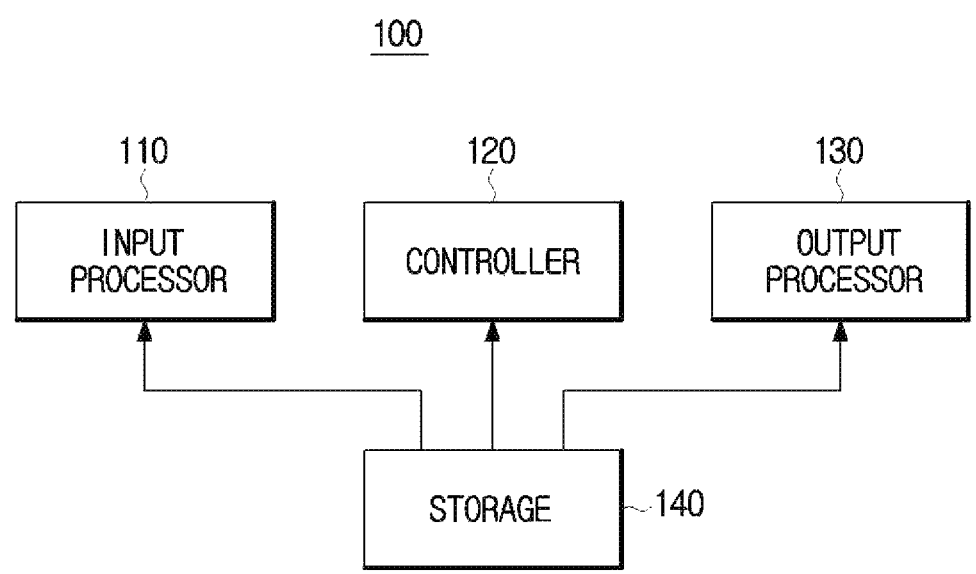
FIG. 1 is a control block diagram of a dialogue system 100.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, like reference numerals refer to like elements throughout the specification. Well-known functions or constructions are not described in detail since they would obscure the one or more exemplary forms with unnecessary detail. Terms such as "unit", "module", "member", and "block" may be embodied as hardware or software. According to forms, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the specification, when a member is disposed "on" another member, this includes not only when the member is in contact with the other member, but also when there is another member between the two members.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to forms of the present disclosure, examples of which are illustrated in the accompanying drawings.

FIG. 1 is a control block diagram of a dialogue system 100.

Referring to FIG. 1, in one form of the present disclosure, the dialogue system 100 may include an input processor 110, a storage 140, a controller 120 and a output processor 130.

The input processor 110 may authenticate a user and receive new input information and new state information of the user.

Input information corresponds to information capable of starting a service to be provided to the user, and the state information corresponds to information related to the current context of the user. A detailed description thereof will be described later.

The input processor 110 may receive the new state information including a user utterance and a user non-verbal response. The user utterance is a verbal response spoken by the user, and the non-verbal response is all biological responses of the user except the verbal response. The input processor 110 may receive a feedback response of the user corresponding to the service provided to the user. The feedback response includes verbal and nonverbal responses generated after the user is provided with the service.

The input processor 110 may receive two kinds of input such as a user speech and an input except for the speech. The input except for the speech may include recognition of user gesture, an input except for the user speech input by an operation of an input device, and user information indicating a user state. In addition, other than the above mentioned information, information related to the user may be input to the input processor 110, as long as information is used for recognizing a user intention or providing a service to a user. The input processor 110 converts a user speech into an utterance in the text type by recognizing the user speech and recognizes a user intention by applying natural language understanding technology to the user utterance.

The input processor 110 transmits the user intention, which is obtained by the natural language understanding technology, and the information related to the context, to the controller 120. The input processor 110 may receive the user utterance. When a response, which is generated after the user utterance, is a speech response, a speech input device 110 may receive the response after the utterance, together with the utterance.

The storage 140 may store existing state information of the user, existing input information that was input in the past, and available services. The storage 140 may store service history in the past, corresponding to the existing state information of the user, and the existing input information that was input in the past. History represents comprehensive information related to services provided to user, based on user state information and input information.

The storage 140 stores a variety of information for the dialogue processing and the service provision. For example, the storage 140 may pre-store information related to domains, actions, speech acts and entity names used for the natural language understanding, and store a context understanding table used for understanding the context from the input information. In addition, the storage 140 may pre-store data detected by a sensor provided in the vehicle, information related to a user, and information needed for the action.

The storage 140 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage is not limited thereto. The storage 140 may be a memory that is implemented by a chip separate from the above mentioned processor related to the controller 120, or the storage 140 may be implemented by a single chip with a processor.

The controller 120 may determine a service to be provided to the user by corresponding new input information and new state information, to the existing input information and existing state information. The controller 120 may determine a service to be provided to the user, based on the service history. In addition, the controller 120 may extract the service history based on the new input information, the new state information, and the feedback response of the user. The controller 120 may allow the user to select at least one service to be provided to the user, based on the new input information, and the new state information. In addition, when additional user state information is needed for the service to be provided to the user, the controller 120 may induce the user to perform an additional utterance.

The controller 120 determines an action corresponding to the user intention and the current context based on the user intention and the information related to the context transmitted from the input processor 110, and manages factors that are needed to perform the corresponding action.

In some forms of the present disclosure, the action may represent all kinds of operations for providing a certain service, and the kinds of the action may be determined in advance. As needed, providing a service may correspond to performing an action. Particularly, the controller 120 may perform a learning based on the response acquired after the input utterance, and recognize the user intention.

For example, a service such as route guidance may be pre-defined and it may be possible to extract an action corresponding to a user utterance, i.e., an action intended by a user, among the pre-defined services, according to the stored inference rule. In addition, an action related to an event occurred in the vehicle may be pre-defined and then stored in the storage 140.

There is no limitation in the kinds of the service. If it is pre-defined that an action is allowed to be performed by the dialogue system 100 via a communication and the stored information, and if the inference rule thereof or a relationship with other action/event is stored, the action may become the above mentioned service.

The controller 120 transmits information related to the determined action to the output processor 130.

The output processor 130 may determine a service format to be provided to the user, based on the new input information and the new state information. The service format includes a case in which the system performs an utterance first, and a case in which the system asks an additional question. The output processor 130 may determine a service format to be provided to the user, based on the history. In addition, the output processor 130 may determine whether to output a follow-up service, based on the new state information of the user. The follow-up service may include a service to be provided when the user performs an additional utterance and a comprehensive service after the service that is provided to the user.

The output processor 130 generates and outputs a dialogue response and a command that is needed to perform the transmitted action. The dialogue response may be output in text, image or audio type. When the command is output, a service such as vehicle control and external content provision, corresponding to the output command, may be performed.

As mentioned above, the dialogue system 100 provides a dialogue processing technology specialized for the vehicle environment. All components or some components of the dialogue system 100 may be contained in the vehicle. The dialogue system 100 may be provided in a remote server and the vehicle may serve as a gateway between the dialogue system 100 and a user. In any case, the dialogue system 100 may be connected to a user via the vehicle or a mobile device connected to the vehicle.

The input processor, the controller 120, and the output processor 130 may be implemented using a memory (not shown) storing an algorithm for controlling an operation of components in the dialogue system 100 and data related to programs implementing the algorithm, and a processor (not shown) performing the above mentioned operation using the data stored in the memory. The memory and the processor may be implemented in separate chips, or a single chip.

Although not shown in FIG. 1, the dialogue system 100 may further include a communicator.

The communicator may receive data, which becomes a base of the service to be provided to the user, from the outside.

The communicator may include at least one component configured to communicate with an external device. For example, the communicator may include at least one of a short range communication module, a wired communication module, and a wireless communication module.

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module may include a variety of wired communication module, e.g., Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard 232 (RS-232), power line communication or plain old telephone service (POTS).

The wireless communication module may include a wireless communication module supporting a variety of wireless communication methods, e.g., Wifi module, Wireless broadband module, Global System for Mobile (GSM) Communication, Code Division Multiple Access (CDMA), Wideband Code Division Multiple Access (WCDMA), Time Division Multiple Access (TDMA), and Long Term Evolution (LTE).

The wireless communication module may further include a wireless communication interface provided with an antenna and a transmitter that is configured to transmit the input signal. In addition, the wireless communication module may further include an input signal conversion module configured to convert a digital control signal, which is output from the controller 120 via the wireless communication interface, into a wireless signal in an analog type in response to the control of the controller 120.

The wireless communication module may further include a wireless communication interface provided with an antenna and a receiver that is configured to receive the input signal. In addition, the wireless communication module may further include an input signal conversion module configured to demodulate a wireless signal in an analog type, which is received via the wireless communication interface, into a digital control signal.

Figure 2:
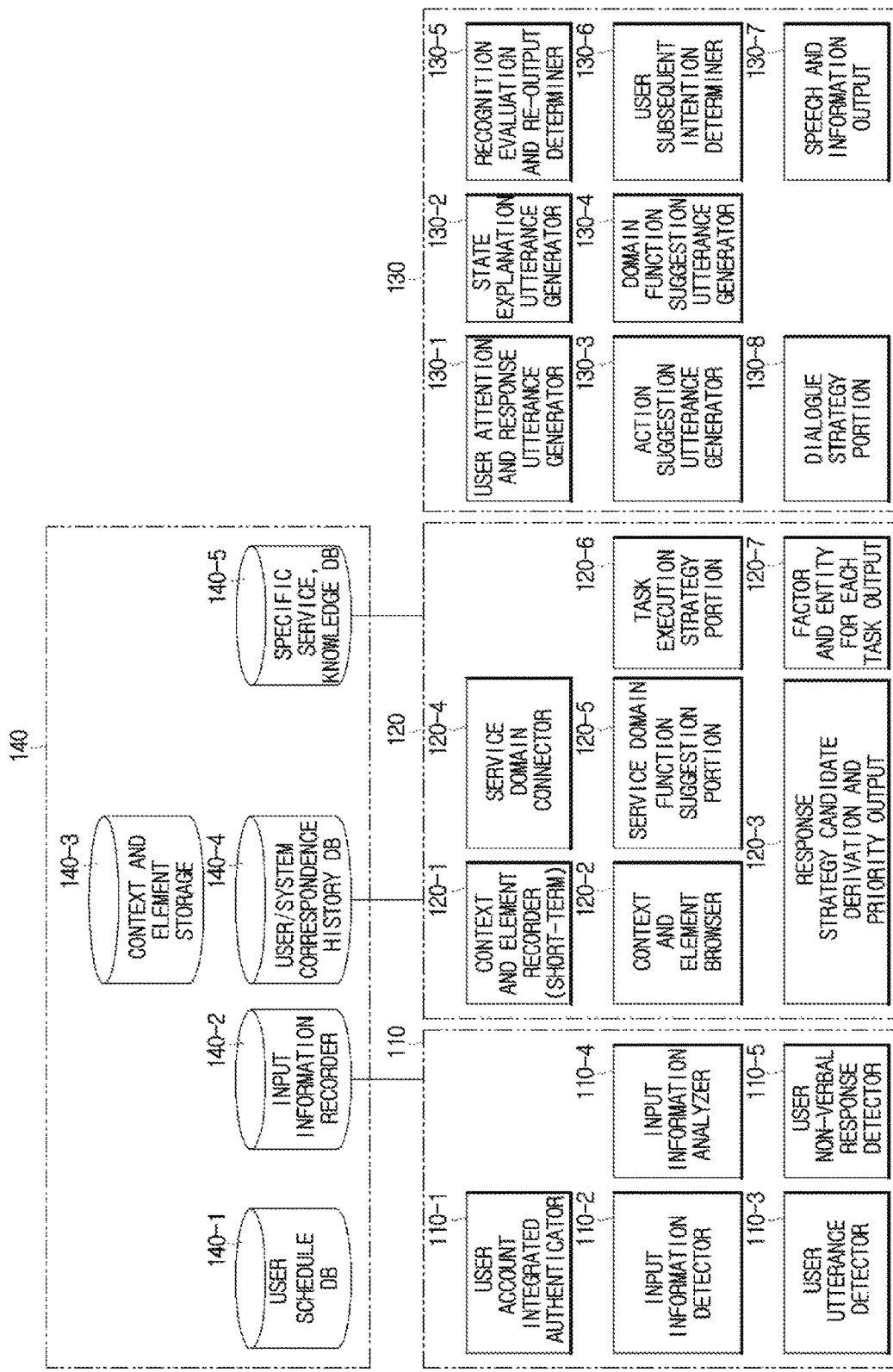
FIG. 2 is a detailed control block diagram of the dialogue system 100.

FIG. 2 is a detailed control block diagram of the dialogue system 100 in some forms of the present disclosure.

The input processor 110 may include a user account integrated authenticator 110-1, an input information detector 110-2, a user utterance detector 110-3, an input information analyzer 110-4, and a user non-verbal response detector 110-5.

The user account integrated authenticator 110-1 may perform an authentication for associating a user account of an external service domain.

The input information detector 110-2 may receive or detect information about a change such as an input event occurrence of service domain held or used by the user.

The user utterance detector 110-3 may detect a simple pattern dialogue, which is pre-stored, as well as an utterance of a plurality of users and system call words.

The input information analyzer 110-4 may recognize an urgency and immediacy of the input information, a user's expected interest, an estimated time for browsing, and the type of information (confirmation, explanation, question, consent, addition, rejection, and consultation).

The user non-verbal response detector 110-5 may detect non-verbal information upon the utterance such as a plurality of user position and posture, a change in the movement, biometric information (facial expression, heartbeat, and body temperature) of a certain user.

The controller 120 may include a context and element recorder 120-1, a context and element browser 120-2, and a response strategy candidate derivation and priority output 120-3.

The context and element recorder 120-1 may perform cross-reference and synchronize the detected internal/external data, system log, and position/time and record it. As mentioned above, the above mentioned information may be stored in the storage 140 when a predetermined period of time is expired.

The context and element browser 120-2 may browse the past history having similarity when there is a user additional request or a system's additional request, or when the input internal/external stimulus is detected, and browse the previous system operation/user input when a number of times of continuous system operation is needed.

The response strategy candidate derivation and priority output 120-3 may develop a response strategy candidate and a priority thereof (confirmation, explanation, question, consent, addition, rejection, and consultation) about a result of recognizing context about the detected input data (simultaneous recognized internal/external data, and affirmation or negation of the user).

The controller 120 may include a service domain connector 120-4, a service domain function suggestion portion 120-5, a task execution strategy portion 120-6, and a factor and entity for each task output 120-7.

The service domain connector 120-4 may perform the service domain call, receiving and providing the necessary information, and displaying related contents.

The service domain function suggestion portion 120-5 may suggest functions of the service domain among the context response strategy candidates, and identify and suggest possible implementations.

The task execution strategy portion 120-6 may estimate details of the type and amount of task of the system and the user, a starting point and an end point of the task, a result of an execution of the task, a method of execution, and a modality, and modify the details according to a strategy formulation and a progress thereof.

When a suggestion of the system is needed or not needed, the user may take action such as confirmation, consent, rejection, explanation, question, addition, consultation.

The factor and entity for each task output 120-7 may check whether to extract information which is needed for performing detailed steps of task, or whether to acquire the information from the user, the outside, the service or the inside of the system, and record an additional utterance generation necessity, when it is needed that the information is acquired from the user or the outside.

The output processor 130 may include an attention and response utterance generator 130-1, a state explanation utterance generator 130-2, an action suggestion utterance generator 130-3, a domain function suggestion utterance generator 130-4, a recognition evaluation and re-output determiner 130-5, a user subsequent intention determiner 130-6, a speech and information output 130-7 and a dialogue strategy portion 130-8.

The attention and response utterance generator 130-1 may generate a predetermined short sentence utterance according to a general conversation strategy (detecting the user's will for dialogue and indicating interest in the user's dialogue), rather than main contents.

The state explanation utterance generator 130-2 may generate an utterance based on additional information about contexts based on an existing context record, a knowledge DB, and a service domain.

The action suggestion utterance generator 130-3 may generate a suggestion that suggests a user's action based on an existing correspondence history, a service domain, a user affirmation or negation.

The domain function suggestion utterance generator 130-4 may generate a suggestion that suggests use of a specific function to the user, based on the correspondence history, and the service domain.

The recognition evaluation and re-output determiner 130-5 may evaluate user recognition (consent, postponement, understanding, rejection, and ignorance) according to the user's affirmation or negation, which is related to a case in which the system performs an utterance first, and a case in which the system performs an utterance while making dialogue, and according to the external data, and determine whether to re-output an utterance. In addition, when re-outputting an utterance, the recognition evaluation and re-output determiner 130-5 may change an order of utterance, modality, and intensity of a part of speech in the sentence.

The user subsequent intention determiner 130-6 may determine the recognition (consent, postponement, understanding, rejection, and ignorance), whether to continue or to stop the task, or the input suggestion necessity.

The speech and information output 130-7 may determine and display a modality, a point of time, and a speed of the system output information.

The dialogue strategy portion 130-8 may determine a length, a section, and a length for each turn of the entire dialogue, the system attitude and the number of follow up suggestions based on user's intervention activeness, and modify the strategy according to the progress thereof.

The storage 140 may include a user schedule DB 140-1, an input information recorder 140-2, a context and element storage 140-3, a correspondence history DB 140-4, and a specific service DB 140-5.

The user schedule DB 140-1 may store a context, which is directly input from a user, a context which is spoken by other user, or a context which was automatically and regularly recorded in the past. For example, the user schedule DB 140-1 may store contexts related to sleeping, eating, or moving.

The input information recorder 140-2 may record an event and an information pattern for each service domain and utilize the event and information pattern for establishing a future response strategy.

The context and element storage 140-3 may be stored in the above mentioned context and element recorder, after a certain period of time elapses, The context and element storage 140-3 may be stored for each category index such as a time, a location, and a source.

The correspondence history DB 140-4 may store the history such as a case in which a user responds to a specific context or element, and a case in which a user consents, changes, or rejects the system's suggestion when the systems provides a suggestion.

The specific service DB 140-5 may store the types of services and detailed functions and knowledge that the system can provide directly or through a connection.

At least one component may be added or deleted corresponding to the capabilities of the components of the dialogue system 100 shown in FIGS. 1 and 2. It will be readily understood by those skilled in the art that the mutual position of the components can be changed corresponding to the performance or structure of the system.

The components of the dialogue system 100 shown in FIGS. 1 and 2 may be embodied as software or hardware, such as Field Programmable Gate Array (FPGA), Application Specific Integrated Circuit (ASIC).

FIGS. 3 to 6 are views illustrating an example of dialogue in some forms of the present disclosure.

Referring to FIGS. 3 to 6, after the user authentication, when input information requiring a notification is input, it may be possible to extract context information by receiving user state information. In addition, it may be possible to determine a service to be provided, and a service format, based on the existing information that has been stored from the past. The state information represents determining whether the user can browse and process the input information. The determination of the service to be provided to the user represents developing a response strategy of the service to be provided to the user. In addition, the determination of the service format represents that outputting is performed based on whether a user responds or not and whether a user recognizes or not.

Figure 3:
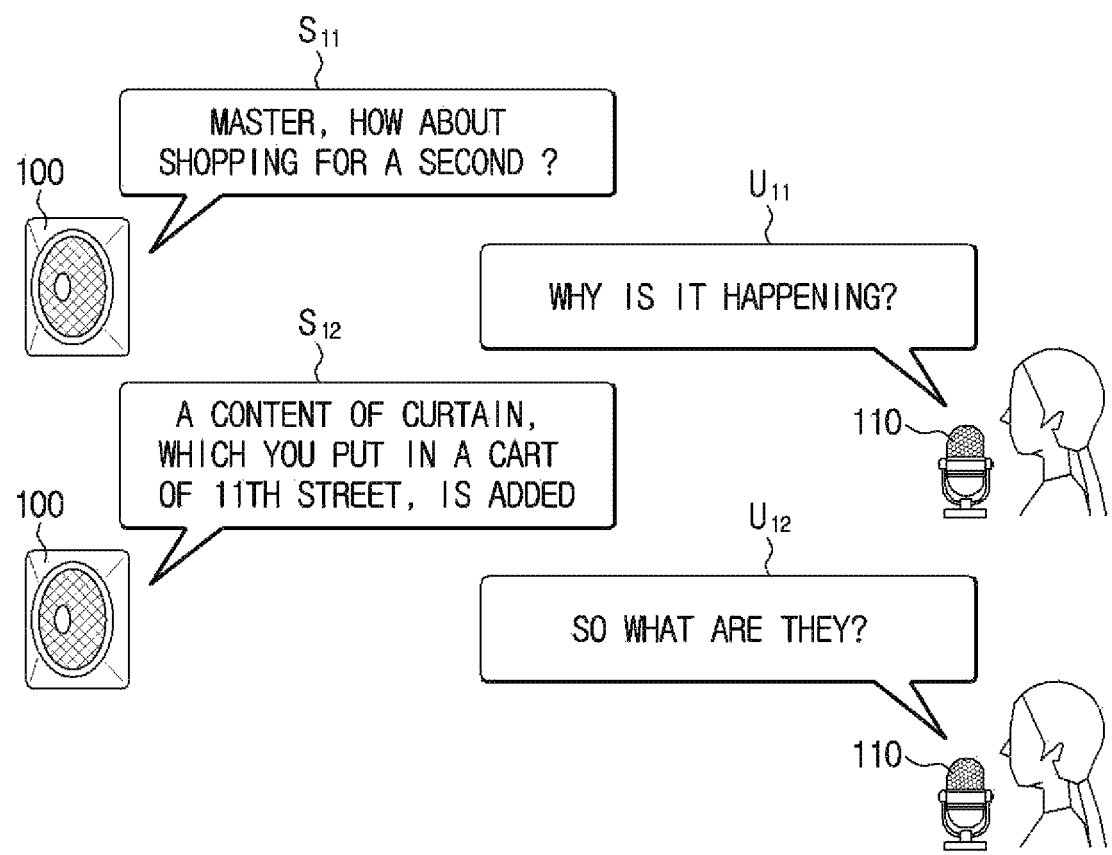
FIGS. 3 to 6 are views illustrating an example of dialogue.

FIG. 3 illustrates that the dialogue system 100 receives information related to a shopping cart, as new input information. The dialogue system 100 may receive information indicating that content is added to the shopping cart, as new input information. The dialogue system 100 may extract state information by determining whether a user can respond to the information, and when it is determined that the user can respond to the information, the dialogue system 100 may output guidance about the content of the shopping cart. The output processor 130 may determine a service format as "suggestion" and suggest a shopping to the user ($S_{11}$). In response to the suggestion, the user may make a question ($U_{11}$). The dialogue system 100 may determine that the user can respond to the information and output guidance about the added content ($S_{12}$). Accordingly, the user may request a follow-up service through an additional utterance ($U_{12}$).

Figure 4:
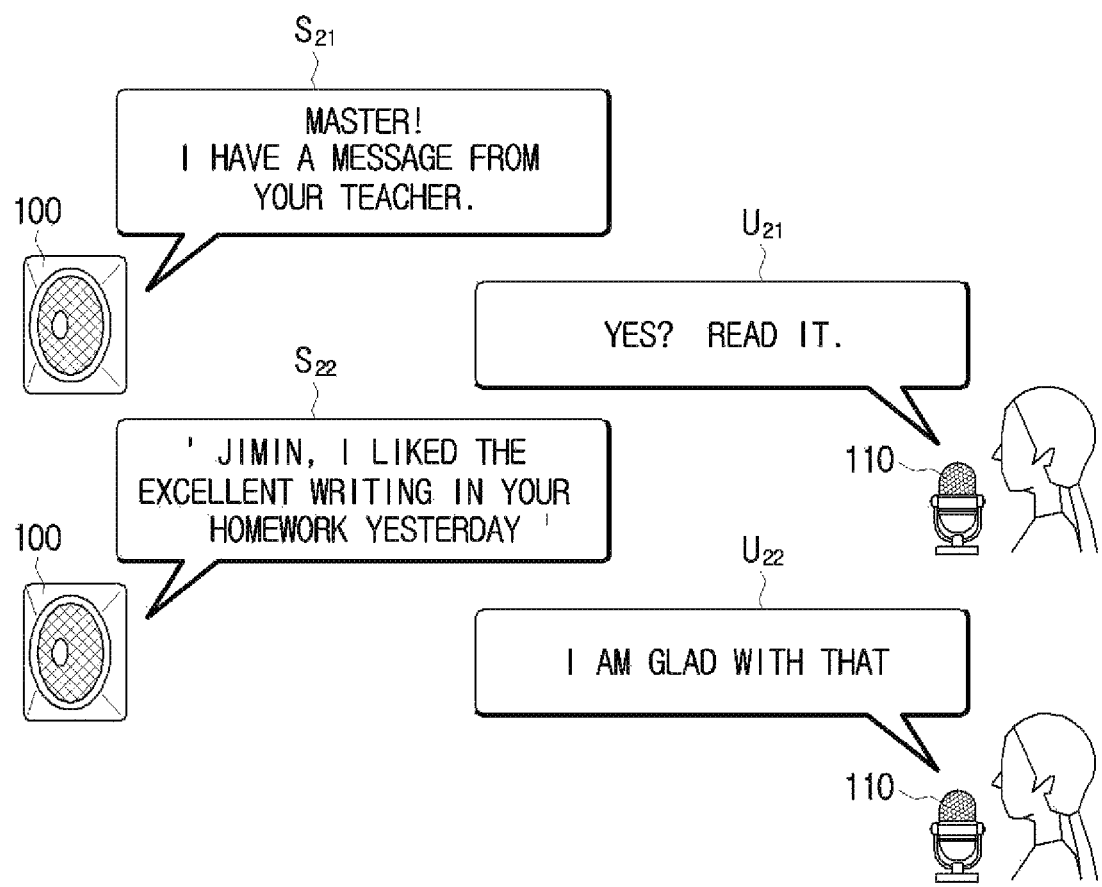

FIG. 4 illustrates the output of the dialogue system 100 related to a notification when a message is received. The dialogue system 100 may determine the received message as input information and when it is determined that the user can confirm a notification, the dialogue system 100 may output a message notification ($S_{21}$). In response to the notification, the user may sequentially make an utterance to allow the dialogue system 100 to read the received message ($U_{21}$). The dialogue system 100 receiving the user utterance may output the received message as a sound ($S_{22}$). In response to the output, the user may make a response with the satisfaction by a feedback response ($U_{22}$). The response may be used for establishing the history.

Figure 5:
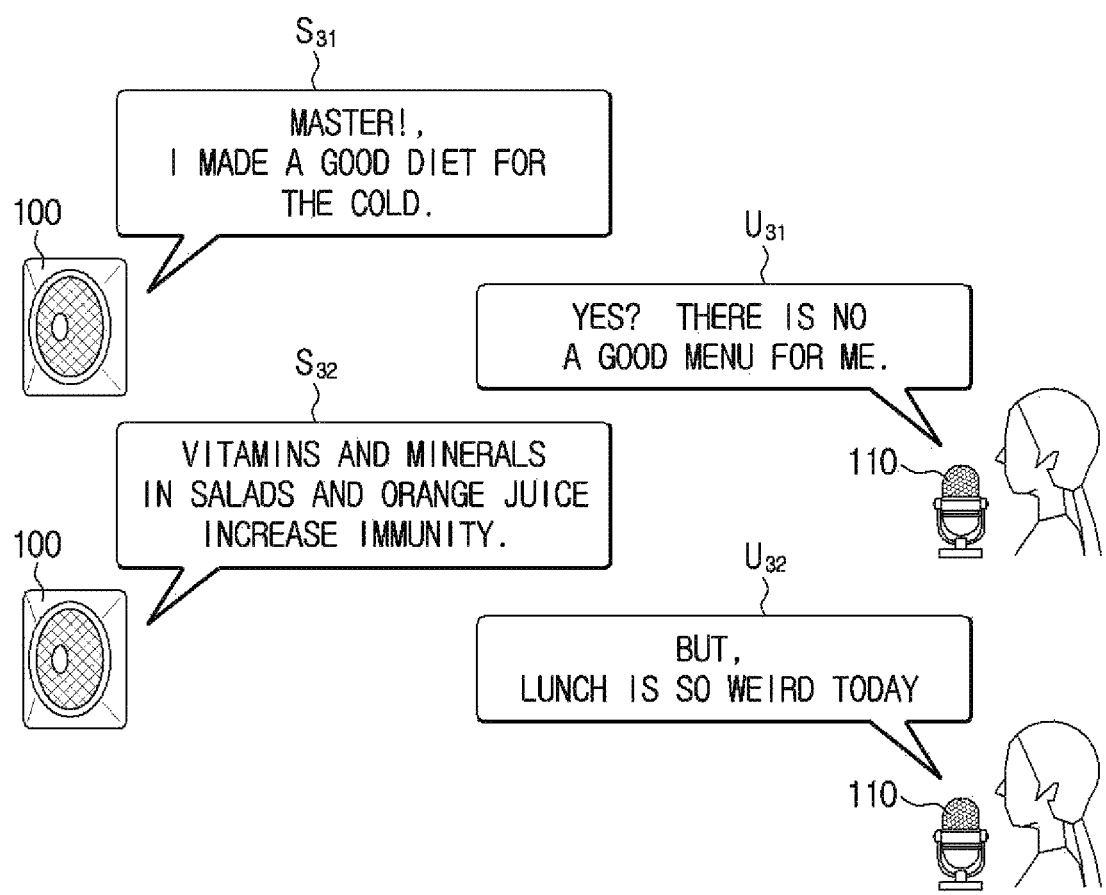

FIG. 5 illustrates the dialogue system 100 suggests a diet. Since the user state information includes a non-verbal state, the dialogue system 100 may determine whether a user has a cold or not, and receive diet information as input information. The dialogue system 100 may inform the user of completing making a good diet for the user current state, i.e., a state in which the user has a cold, ($S_{31}$). The user may respond to the information ($U_{31}$). In response to the response, the dialogue system 100 may deliver the diet to the user ($S_{32}$). Accordingly, the user may perform the feedback to the diet suggested by the dialogue system 100 ($U_{32}$), and the dialogue system 100 may form feedback information based on the user's feedback.

Figure 6:
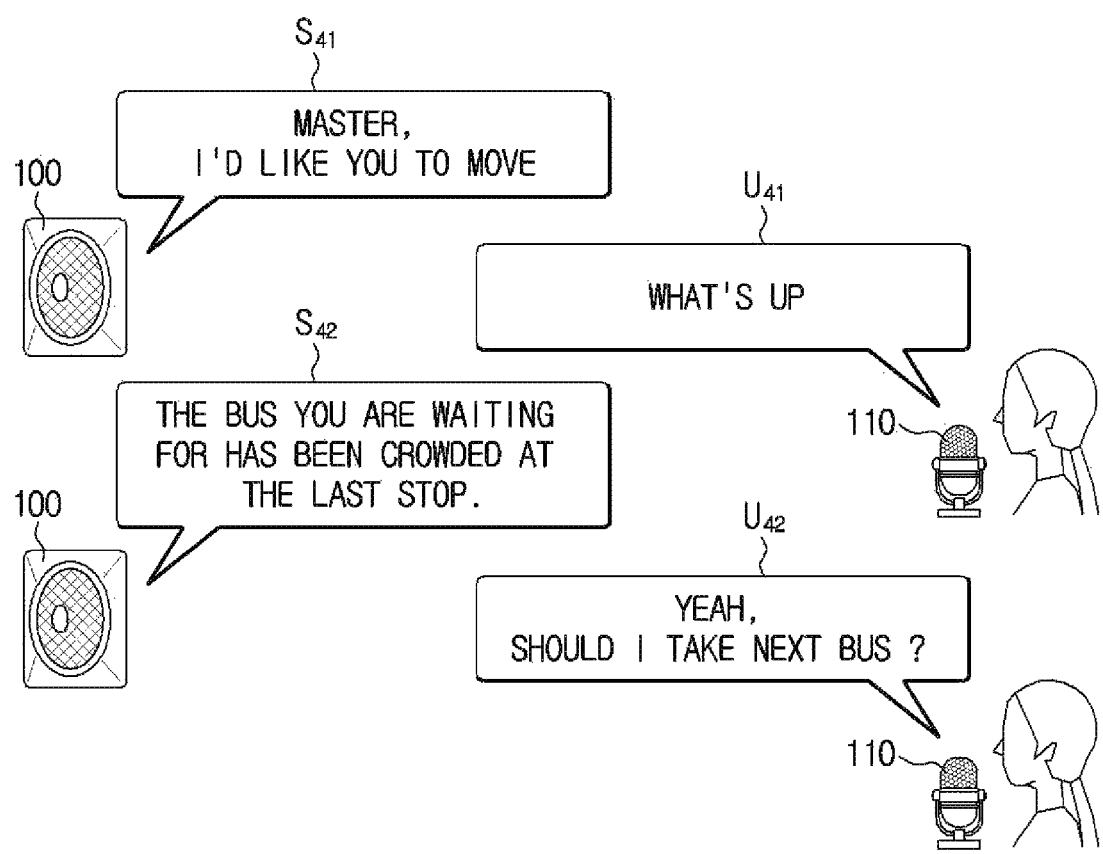

FIG. 6 illustrates that the dialogue system 100 suggests the movement of the user based on traffic information. The dialogue system 100 may receive the traffic information as new input information and suggest the movement by deriving information such as user's location, as state information ($S_{41}$). The user may ask detailed information about the suggestion of the dialogue system 100 ($U_{41}$). When it is determined that the user asks detailed information, the dialogue system 100 may inform the user of the needed information by corresponding to the current context ($S_{42}$). In response to the information, the user may request a follow-up service for information about a next bus ($U_{42}$).

FIGS. 3 to 6 are views illustrating how to operate input information and state information between the user and the dialogue system 100, as an example, but the operation between the dialogue system 100 and the user is not limited thereto. Alternatively, there may be no limitation in the type of the dialogue system 100 as long as that the dialogue system 100 is configured to determine a service to be provided to a user by matching new input information and new state information with the existing input information and the existing state information, respectively, and configured to determine a service format to be provided to a user.

Figure 7:
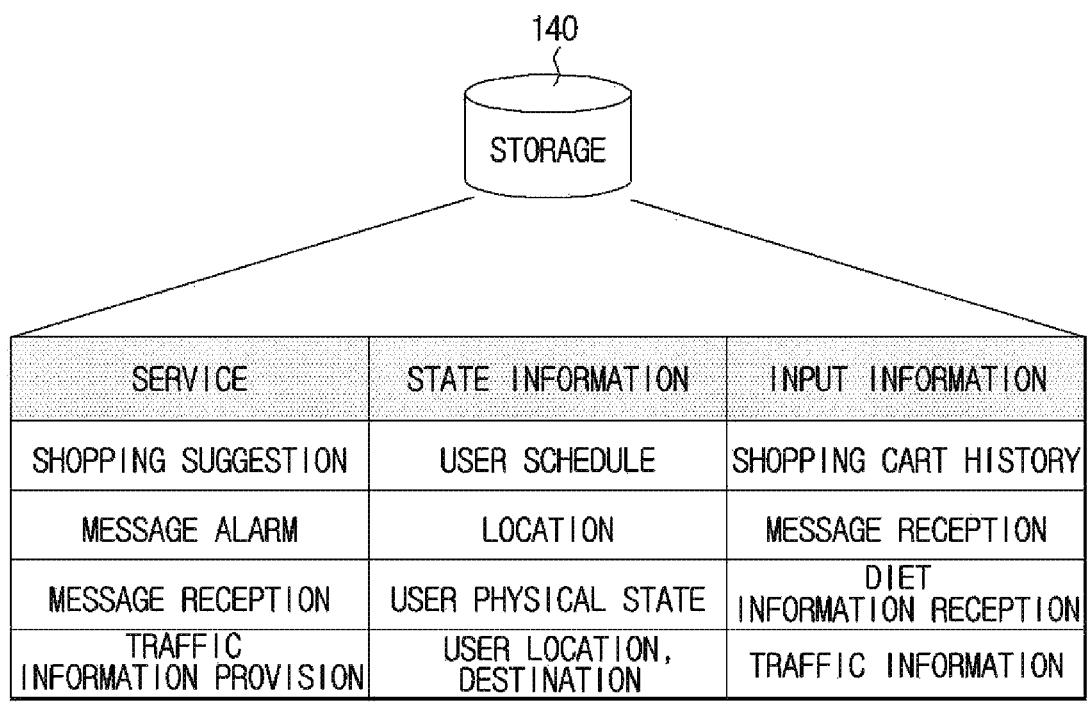
FIG. 7 is a view illustrating service information provided to a user.

FIG. 7 is a view illustrating service information provided to a user in some forms of the present disclosure.

FIG. 7 illustrates the type of the information used in FIGS. 3 to 6.

The dialogue system 100 may use information stored in the storage 140.

When the dialogue system 100 suggests a shopping suggestion service to a user, the dialogue system 100 may receive a shopping cart history as input information. That is, the dialogue system 100 may receive existing user shopping cart information and content addition information corresponding to the shopping cart information, as input information. In addition, when the dialogue system 100 determines that the user can do shopping, by recognizing a user state, e.g., a user schedule, the dialogue system 100 may suggest the shopping.

When the dialogue system 100 outputs a message alarm to the user, the dialogue system 100 may receive information indicating that the message is received, as input information. In addition, when it is determined that the user can hear the message alarm, the dialogue system 100 may output the alarm to allow the user to recognize the alarm.

When the dialogue system 100 is intended to suggest the diet to the user, the dialogue system 100 may receive diet information as input information and determine the user state based on the user's physical state. As mentioned above, when it is determined that the user has a cold, the dialogue system 100 may extract information indicating that the user has a cold, as the state information, and then suggest the diet information to the user.

When the dialogue system 100 is intended to provide traffic information to the user, the dialogue system 100 may receive traffic information as input information, and extract state information in consideration to the user's location, and a destination where the user is intended to go. Accordingly, the dialogue system 100 may provide the traffic information to the user. In addition, the dialogue system 100 may perform an operation such as suggesting the user to use the public transportation.

The operation illustrated in FIG. 7 illustrates that only input information and state information corresponding to the drawings. However, there may be no limitation in the type of information for deriving a service to be provided to a user and the type derived information.

FIGS. 8 to 11 are flowcharts in some forms of the present disclosure.

Figure 8:
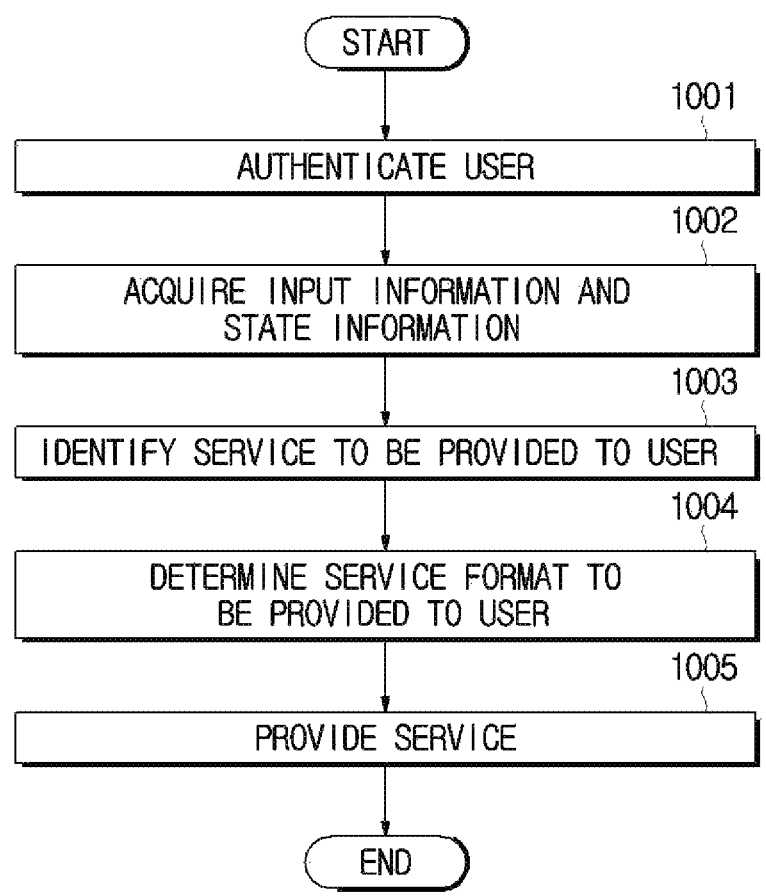
FIGS. 8 to 11 are flowcharts.

Referring to FIG. 8, the dialogue system 100 may authenticate a user (1001), and acquire input information and state information (1002). The dialogue system 100 may determine a service to be provided to the user (1003). In addition, the output processor 130 may determine a service format to be provided to the user (1004). The dialogue system 100 may determine the service to be provided to the user and the service format, thereby providing the service (1005).

Figure 9:
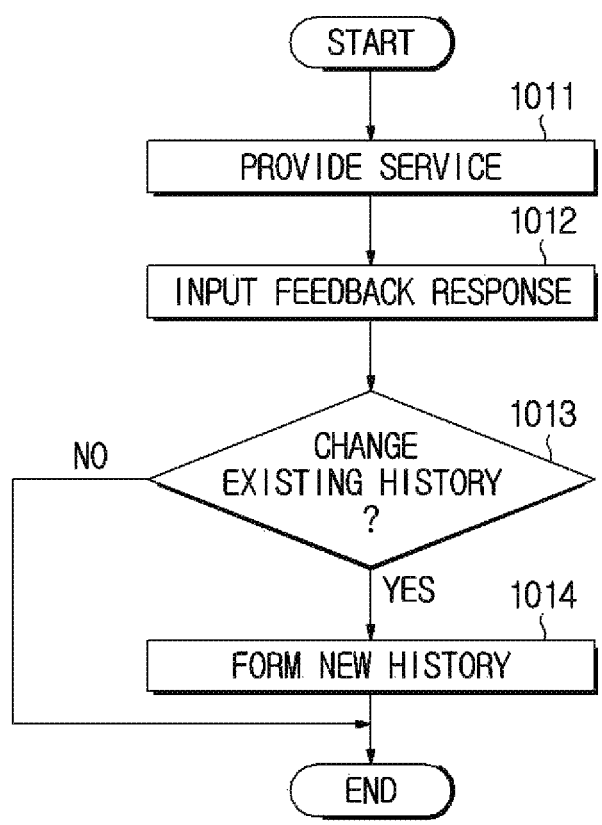

Referring to FIG. 9, the dialogue system 100 may provide the service (1011), and the user may input a feedback response based on the service of the dialogue system 100 (1012). The dialogue system 100 may determine whether to change the existing history, based on the feedback response of the user (1013). When it is needed to change the history, the dialogue system 100 may form new history (1014).

Figure 10:
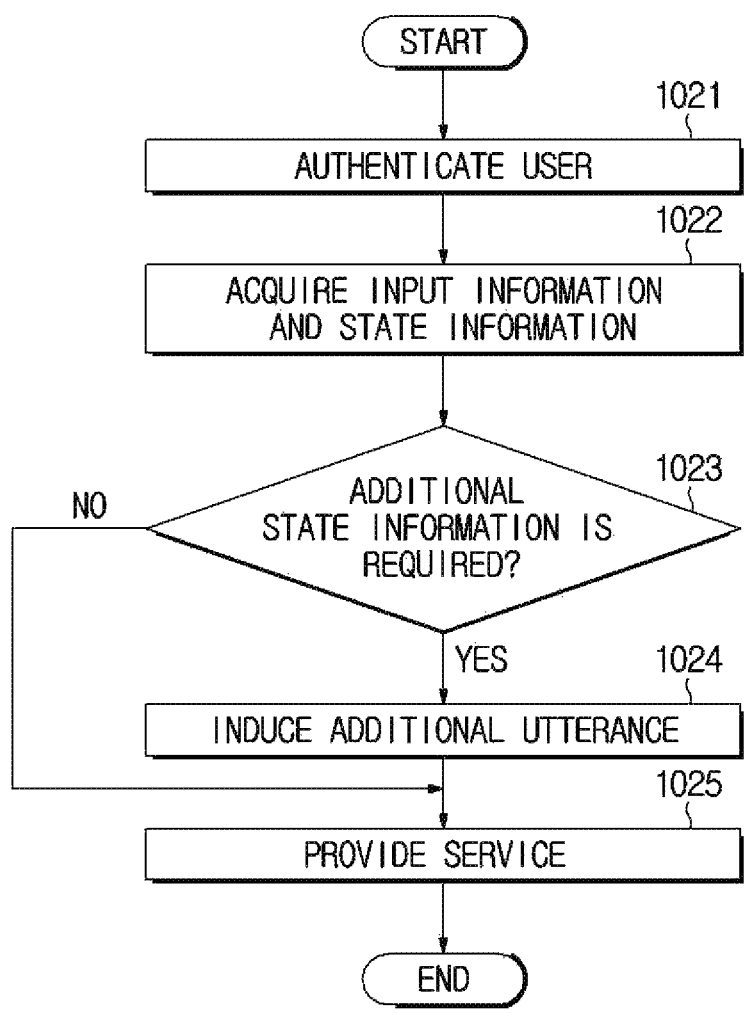

Referring to FIG. 10, the dialogue system 100 may authenticate a user (1021), and acquire input information and state information (1022). The dialogue system 100 may determine whether additional information is needed to determine a service to be provided to the user (1023). When it is determined that the additional information is needed, the dialogue system 100 may induce an additional utterance (1024). The dialogue system 100 may provide the service based thereon (1025).

Figure 11:
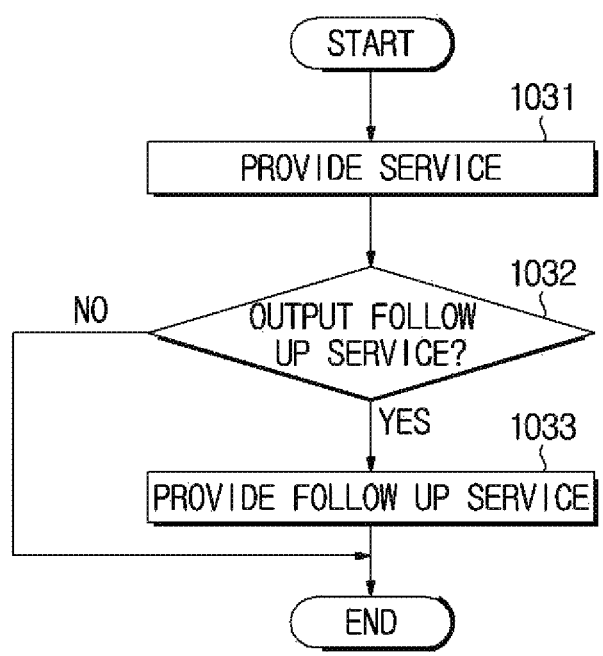

Referring to FIG. 11, after providing the service (1031), the dialogue system 100 may determine whether a follow-up service is needed, based on the user's utterance (1032). When it is determined that the follow-up service is needed, the dialogue system 100 may provide the follow-up service (1033).

Meanwhile, some forms of the present disclosure may be embodied in the form of a recording medium storing instructions executable by a computer. The instructions may be stored in the form of program code and, when executed by a processor, may generate a program module to perform the operations of some forms of the present disclosure. The recording medium may be embodied as a computer-readable recording medium.

The computer readable recording medium may include various kinds of recording medium stored data decrypted by the computer system. For example, there may be a Read Only Memory (ROM), a Random Access Memory (RAM), a magnetic tape, a magnetic disk, a flash memory, and an optical data storage device As is apparent from the above description, the dialogue system and the method for controlling thereof may provide a service optimized for a user by identifying a service needed for the user based on new information and a user state.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A dialogue system comprising:
an input processor configured to authenticate a user and to receive new input information and new state information of the user;
a storage configured to store existing state information of the user, existing input information, and available services;
a controller configured to:
identify a service based on the new input information and the existing input information; and
identify the service based on the new state information of the user and the existing state information of the user,
wherein the service is configured to fit needs of the user; and
an output processor configured to determine a service format based on the new input information and the new state information of the user, wherein the service format relates to ways to provide the service to the user,
wherein the input processor is configured to receive a feedback response of the user corresponding to the service provided to the user, and to determine whether to change an existing service history based on the feedback response of the user, and
wherein the controller is configured to extract a service history based on the new input information, the new state information of the user, and the feedback response of the user.

2. The dialogue system claim 1, wherein the new state information comprises one or more of an utterance of the user and a non-verbal response of the user.

3. The dialogue system of claim 1, wherein:
the storage is configured to store a service history corresponding to the existing state information of the user and the existing input information, and
the controller is configured to identify the service based on the service history.

4. The dialogue system of claim 3, wherein:
the output processor is configured to determine the service format based on he service history.

5. The dialogue system of claim 1, wherein:
the controller is configured to enable the user to select at least one of the services based on the new input information and the new state information of the user.

6. The dialogue system of claim 1, wherein:
the controller is configured to induce the user to perform an additional utterance when additional state information of the user is needed.

7. The dialogue system of claim 1, wherein:
the output processor is configured to determine whether to output a follow-up service based on the new state information of the user.

8. The dialogue system of claim 1, wherein the dialogue system further comprises:
a communicator configured to receive data from an external source, wherein the data is utilized to form a basis of the service.

9. A method for controlling of a dialogue system comprising:
authenticating, with an input processor, a user;
receiving, with the input processor, new input information and new state information of the user, and a feedback response of the user corresponding to a service provided to the user;
storing, with a storage, existing state information of the user, existing input information, and available services;
identifying, with a controller, a service based on the new input information and the existing input information;
identifying, with the controller, the service based on the new state information of the user and the existing state information of the user;
determining, with an output processor, a service format based on the new input information and the new state information of the user, wherein the service is configured to fit needs of the user and the service format relates to ways to provide the service to the user;
extracting, with the controller, a service history based on the new input information, the new state information of the user, and the feedback response of the user; and
determining, with the controller, whether to change an existing service history based on the feedback response of the user.

10. The method of claim 9, wherein the new state information comprises one or more of an utterance of the user and a non-verbal response of the user.

11. The method of claim 9, wherein:
storing, with the storage, a service history corresponding to the existing state information of the user and the existing input information; and
identifying, with the controller, the service based on the service history.

12. The method of claim 11, wherein:
determining, with the output processor, the service format based on the service history.

13. The method of claim 9, wherein:
enabling, with the controller, the user to select at least one of the services based on the new input information and the new state information of the user.

14. The method of claim 9, wherein:
when additional state information of the user is needed, inducing, with the controller, the user to perform an additional utterance.

15. The method of claim 9, wherein:
determining, with the output processor, whether to output a follow-up service based on the new state information of the user.

16. The method of claim 9, wherein the method further comprises:
receiving, with a communicator, data from an external source, wherein the data is utilized to form a basis of the service.

* * * * *